United States Patent
Gould et al.

(10) Patent No.: US 9,455,880 B2
(45) Date of Patent: Sep. 27, 2016

(54) METHOD AND SYSTEM FOR INTELLIGENT ROUTING OF REQUESTS OVER EPP

(71) Applicants: James Gould, Leesburg, VA (US); Mahendra Jain, Sterling, VA (US); Colin Lloyd, Fairfax, VA (US)

(72) Inventors: James Gould, Leesburg, VA (US); Mahendra Jain, Sterling, VA (US); Colin Lloyd, Fairfax, VA (US)

(73) Assignee: VERISIGN, INC., Reston, VA (US)

( * ) Notice: Subject to any disclaimer, the term of this patent is extended or adjusted under 35 U.S.C. 154(b) by 641 days.

(21) Appl. No.: 13/681,330

(22) Filed: Nov. 19, 2012

(65) Prior Publication Data

US 2013/0198410 A1    Aug. 1, 2013

Related U.S. Application Data

(63) Continuation of application No. 12/543,462, filed on Aug. 18, 2009, now Pat. No. 8,327,019.

(51) Int. Cl.
*G06F 15/173* (2006.01)
*H04L 12/24* (2006.01)
*H04L 29/12* (2006.01)
*H04L 29/08* (2006.01)

(52) U.S. Cl.
CPC ......... *H04L 41/50* (2013.01); *H04L 29/12632* (2013.01); *H04L 61/302* (2013.01); *H04L 67/2814* (2013.01)

(58) Field of Classification Search
CPC ........ H04L 41/00; H04L 63/10; H04L 63/20
USPC ................................ 709/226, 227, 238, 242
See application file for complete search history.

(56) References Cited

U.S. PATENT DOCUMENTS

| | | | |
|---|---|---|---|
| 5,892,946 A * | 4/1999 | Woster et al. | 719/316 |
| 6,895,430 B1 | 5/2005 | Schneider | |
| 6,901,436 B1 | 5/2005 | Schneider | |
| 6,973,505 B1 | 12/2005 | Schneider | |
| 7,043,563 B2 | 5/2006 | Vange et al. | |
| 7,158,967 B1 * | 1/2007 | Turba et al. | |
| 7,188,138 B1 | 3/2007 | Schneider | |
| 7,194,552 B1 | 3/2007 | Schneider | |
| 7,280,999 B2 | 10/2007 | Chung et al. | |
| 7,310,686 B2 | 12/2007 | Uysal | |
| 7,418,471 B2 | 8/2008 | King et al. | |
| 7,480,657 B1 | 1/2009 | Glovin et al. | |
| 7,546,368 B2 | 6/2009 | Drees et al. | |
| 7,565,402 B2 | 7/2009 | Schneider | |
| 7,600,042 B2 | 10/2009 | Lemson et al. | |

(Continued)

OTHER PUBLICATIONS

Rafaella Florou (Examiner), Extended European Search Report issued Apr. 28, 2014, European Application No. 14160044.5 filed Mar. 14, 2014, pp. 1-13.

(Continued)

*Primary Examiner* — Arvin Eskandarnia
(74) *Attorney, Agent, or Firm* — MH2 Technology Law Group, LLP

(57) ABSTRACT

Method and system for routing EPP requests over a network are provided. The EPP request can include XML namespace information and optionally XML sub-product information. A gateway can receive the request and analyze the namespace and in some instances, sub-product information to determine the service to which the request is directed. Thereupon, the gateway can route the request to the appropriate service by consulting a routing table that can have status and connectivity information for all the available services.

35 Claims, 4 Drawing Sheets

(56) References Cited

U.S. PATENT DOCUMENTS

| | | | |
|---|---|---|---|
| 7,631,101 B2 | 12/2009 | Sullivan et al. | |
| 7,685,270 B1 | 3/2010 | Vermeulen et al. | |
| 7,694,016 B2 | 4/2010 | Halley | |
| 7,725,602 B2 | 5/2010 | Liu et al. | |
| 7,734,815 B2 | 6/2010 | Leighton et al. | |
| 7,761,570 B1 | 7/2010 | Halley | |
| 7,769,826 B2 | 8/2010 | Gustafsson | |
| 7,792,836 B2 | 9/2010 | Taswell | |
| 7,814,202 B2 | 10/2010 | Drees et al. | |
| 7,853,643 B1 | 12/2010 | Martinez et al. | |
| 7,925,747 B2 | 4/2011 | Kirwan, Jr. et al. | |
| 7,925,782 B2 | 4/2011 | Sivasubramanian et al. | |
| 7,930,393 B1 | 4/2011 | Baumback et al. | |
| 7,933,951 B2 | 4/2011 | Sullivan et al. | |
| 8,037,168 B2 | 10/2011 | Schneider | |
| 8,103,511 B2* | 1/2012 | Basson | G10L 21/02 704/201 |
| 8,224,994 B1 | 7/2012 | Schneider | |
| RE43,690 E | 9/2012 | Schneider et al. | |
| 8,327,019 B2 | 12/2012 | Gould et al. | |
| RE44,207 E | 5/2013 | Schneider | |
| 8,458,161 B2 | 6/2013 | Schneider | |
| 8,612,565 B2 | 12/2013 | Schneider | |
| 8,635,340 B1 | 1/2014 | Schneider | |
| 2003/0005132 A1 | 1/2003 | Nguyen et al. | |
| 2003/0084057 A1 | 5/2003 | Balogh | |
| 2003/0084074 A1 | 5/2003 | Balogh et al. | |
| 2003/0084075 A1 | 5/2003 | Balogh et al. | |
| 2004/0039798 A1 | 2/2004 | Hotz et al. | |
| 2004/0151290 A1* | 8/2004 | Magarasevic | H04L 63/02 379/93.05 |
| 2004/0254926 A1 | 12/2004 | Balogh | |
| 2005/0027882 A1 | 2/2005 | Sullivan et al. | |
| 2005/0105513 A1 | 5/2005 | Sullivan et al. | |
| 2006/0026300 A1* | 2/2006 | Rose | 709/246 |
| 2006/0034237 A1* | 2/2006 | Patrick et al. | 370/338 |
| 2006/0101155 A1 | 5/2006 | Damour et al. | |
| 2006/0136573 A1* | 6/2006 | Loven | H04L 29/06 709/219 |
| 2006/0265508 A1* | 11/2006 | Angel | H04L 29/12047 709/230 |
| 2007/0070820 A1 | 3/2007 | Gallant | |
| 2007/0100808 A1 | 5/2007 | Balogh | |
| 2007/0153812 A1* | 7/2007 | Kemp | 370/401 |
| 2007/0238466 A1 | 10/2007 | Buckley et al. | |
| 2007/0294419 A1 | 12/2007 | Ulevitch | |
| 2008/0010365 A1 | 1/2008 | Schneider | |
| 2008/0016233 A1 | 1/2008 | Schneider | |
| 2008/0059152 A1 | 3/2008 | Fridman et al. | |
| 2008/0059607 A1 | 3/2008 | Schneider | |
| 2008/0071909 A1 | 3/2008 | Young et al. | |
| 2008/0114799 A1* | 5/2008 | Chasen | 707/101 |
| 2008/0133729 A1 | 6/2008 | Fridman et al. | |
| 2008/0155254 A1 | 6/2008 | Stradling | |
| 2008/0201413 A1 | 8/2008 | Sullivan et al. | |
| 2009/0067409 A1* | 3/2009 | Ku | H04L 12/66 370/352 |
| 2009/0106211 A1 | 4/2009 | Balogh | |
| 2009/0106390 A1 | 4/2009 | Kirwan, Jr. et al. | |
| 2009/0157889 A1 | 6/2009 | Treuhaft | |
| 2009/0234960 A1 | 9/2009 | Kamiya et al. | |
| 2009/0235359 A1 | 9/2009 | Abdulhayoglu et al. | |
| 2009/0268715 A1* | 10/2009 | Jansson | 370/352 |
| 2009/0282027 A1 | 11/2009 | Subotin et al. | |
| 2009/0282028 A1 | 11/2009 | Subotin et al. | |
| 2009/0282038 A1 | 11/2009 | Subotin et al. | |
| 2009/0299748 A1* | 12/2009 | Basson | G10L 21/02 704/270 |
| 2010/0030897 A1 | 2/2010 | Stradling | |
| 2010/0077462 A1 | 3/2010 | Joffe et al. | |
| 2010/0138559 A1 | 6/2010 | Sullivan et al. | |
| 2010/0218040 A1 | 8/2010 | Bodmer et al. | |
| 2010/0257266 A1 | 10/2010 | Holmes et al. | |
| 2010/0274668 A1 | 10/2010 | Langston et al. | |
| 2010/0274836 A1 | 10/2010 | Orentas et al. | |
| 2010/0274970 A1 | 10/2010 | Treuhaft et al. | |
| 2010/0287532 A1 | 11/2010 | Smith et al. | |
| 2010/0318858 A1 | 12/2010 | Essawi et al. | |
| 2011/0022678 A1 | 1/2011 | Smith et al. | |
| 2011/0029662 A1 | 2/2011 | Drees et al. | |
| 2011/0035469 A1 | 2/2011 | Smith et al. | |
| 2011/0035497 A1 | 2/2011 | Daly et al. | |
| 2011/0047292 A1 | 2/2011 | Gould et al. | |
| 2011/0051728 A1 | 3/2011 | Bhogavilli et al. | |
| 2011/0106891 A1 | 5/2011 | Gallant et al. | |
| 2011/0110267 A1 | 5/2011 | Gallant | |
| 2011/0161289 A1 | 6/2011 | Pei et al. | |
| 2011/0179467 A1* | 7/2011 | Wei | H04L 63/1441 726/3 |
| 2012/0173685 A1 | 7/2012 | Shorter et al. | |

OTHER PUBLICATIONS

Hollenbeck, Extensible Provisioning Protocol, 2000, Verisign, pp. 1-47.
Arvin Askandarnia (Examiner), Non-Final Office Action dated Jun. 19, 2013, U.S. Appl. No. 13/835,674, filed Mar. 15, 2013, pp. 1-15.
Author Unknown, International Search Report and Written Opinion dated Sep. 1, 2010, PCT Application No. PCT/US2010/041604, filed Jul. 9, 2010, 8 pp.
Brown, "The Extensible Provisioning Protocol", for CentralNic Ltd., http://ukof.org.uk/uknof5/Brown-EPP, accessed Apr. 1, 2009, 10 pages.
CENTRALNIC LABS, clientDiscloseProhibited, http://labs.centralnic.com/epp/ext/clientDiscloseProhibited.php, accessed Apr. 6, 2009, 1 page.
CENTRALNIC LABS, EPP Object Extension: DNS Time-To-Live (TTL) values for Domain Names, http://labs.centralnic.com/epp/ext/ttl.php, accessed Apr. 6, 2009, 3 pages.
CENTRALNIC LABS, EPP Object Extension: Web Forwarding for Domain Names, http://labs.centralnic.com/epp/ext/wf.php, accessed Apr. 6, 2009, 4 pages.
CENTRALNIC LABS: CentralNic EPP Extensions, http://labs.centralnic.com/epp/ext, accessed Apr. 6, 2009, 1 page.
CENTRALNIC: EPP Service, centralnic.com/registrars/epp, accessed Apr. 1, 2009, 2 pages.
Francis, "Launch of extensible provisioning protocol (EPP)", for Nominet, dated Feb. 21, 2008, https://www.centr.org/main/4141-CTR/version/2/part/12/data?branch=main&language=defaul, 10 pages.
Nominet, "Extensible Provisioning Protocol (EPP)", http://www.nic.uk/registrars/systems/EPP, accessed Apr. 1, 2009, 3 pages.
Nominet, "Planned Changes", http://www.nic.uk/registrars/systems/plannedchanges, accessed Apr. 1, 2009, 6 pages.
Jorg Bohmert (Examiner), Extended European Search Report dated Mar. 29, 2016, European Application No. 10810333.4, pp. 1-10.
S. Hollenbeck (Verisign), "Extensible Provisioning Protocol (EPP)", Network Working Group Internet Draft, Jun. 15, 2009, pp. 1-70.
Eric Brunner-Williams (Editor), Extensible Provisioning Protocol Container, Internet Engineering Task Force Internet Draft, May 2002, pp. 1-42.
Dan Manley, "EPP RTK for Java User Guide", Retrieved from the Internet: http://epp-rtk.sourceforge.net/epp-rtk-fava-0.4.1/java/doc/epp-rtk-user-guide.html, Oct. 3, 2001, pp. 1-43.

* cited by examiner

| Service ID | Sub-Product ID | Service Name | Version | Connectivity Information | Status | Group ID |
|---|---|---|---|---|---|---|
| XML namespace | dotTV | CTLD - Domain Create | 1.0 | t3://10.131.6.75:8001 com.example.ctld.CTLDEPPHandlerBean | Active | ctld |
| XML namespace | -- | Name Suggestion | 2.2 | t2://10.43.1.85:9001 | Inactive | ctld |

*FIG. 3*

METHOD AND SYSTEM FOR INTELLIGENT ROUTING OF REQUESTS OVER EPP

CROSS-REFERENCE TO RELATED APPLICATIONS

This application is a continuation to U.S. patent application Ser. No. 12/543,462 filed on Aug. 18, 2009, which is hereby incorporated by reference in its entirety.

FIELD

The present disclosure relates generally to routing requests over a network.

BACKGROUND

The present disclosure relates generally to routing requests over a network. As internet usage grows exponentially, the demand for internet related services is also growing rapidly. As a result of the increased usage of the internet, the demand for domain names is also growing rapidly. Consequently, demand for domain related services is also on the rise. Such domain related services can include domain name creation, domain name registration renewal, and the like. Typically, a website serves as a primary vehicle for establishing an online presence for a domain name. To meet this ever increasing demand for domain name related services, it is necessary that the entities that provide these service do so in an efficient and cost-effective manner.

The Domain Name System (DNS) is the part of the Internet infrastructure that translates human-readable domain names into the Internet Protocol (IP) numbers needed to establish TCP/IP communication over the Internet. DNS allows users to refer to web sites, and other resources, using easier to remember domain names, such as "www.example.com", rather than the numeric IP addresses associated with a website, e.g., 123.4.56.78, and assigned to computers on the Internet. Each domain name can be made up of a series of character strings (labels) separated by dots. The right-most label in a domain name is known as the "top-level domain" (TLD). Examples of well-known TLDs are "com"; "net"; "org" etc. Each TLD supports second-level domains, listed immediately to the left of the TLD, e.g. the "example" level in "www.example.com". Each second-level domain can include a number of third-level domains located immediately to the left of the second-level domain, e.g. the "www" level in www.example.com.

The responsibility for operating each TLD (including maintaining a registry of the second-level domains within the TLD) is delegated to a particular organization, known as a domain name registry ("registry"). The registry is primarily responsible for answering queries for IP addresses associated with domains ("resolving"), typically through DNS servers that maintain such information in large databases, and operating its top-level domain.

The Internet Corporation for Assigned Names and Numbers (ICANN) has authority over the generic TLDs like dotcom and dotnet. In order to obtain a domain name, that domain name has to be registered with ICANN. Registration of domain names can be done, e.g., through a domain name registrar. A registrar is an entity that is accredited by ICANN or by a national ccTLD (country code TLD) authority, to register Internet domain names. Alternatively, an end-user can register a domain name indirectly through one or more layers of resellers.

A registrar usually has a dedicated service connection with the registries in order to access domain related services, e.g., domain name creation or renewal. Registrars typically use the Extensible Provisioning Protocol (EPP) as a vehicle to communicate with the registries in order to register or renew domain names. The EPP is a protocol designed for allocating objects within registries over the internet. The EPP protocol is based on XML—a structured, text-based format. The underlying network transport is not fixed, although the currently specified method is over Transmission Control Protocol (TCP).

SUMMARY

Certain embodiments of the present invention relate to systems and methods for routing EPP requests over a network. Specifically, in an embodiment, a method for routing requests received using an Extensible Provisioning Protocol (EPP) is provided. A request can be received from a requestor. The request can be to connect to a service, offered by a service provider, via the EPP. The request may include an XML code that includes XML name space information. The XML namespace may indicate information about the service to which the request is directed. The system can analyze the XML code to extract the XML namespace information. After extracting the XML namespace information, the system can determine the service to which the request is directed and route the request to the service, thereby providing the requestor access to the service.

In some embodiments, the request may also include a EPP extension sub-product information. In such an instance, the namespace information may correspond to a service category while the sub-product information may correspond to an individual service within the service category. In this embodiment, the system can extract the namespace information and determine the service to which the request is directed. Then the system can determine if the request additionally includes sub-product information and in the instance where the request includes sub-product information, the system can then determine the service associated with the sub-product information and conclude that the namespace information corresponds to a class of service rather than an individual service.

In some embodiments, the system can extract the namespace information and the sub-product information, if available. If the system determines that the namespace information corresponds to a service category and the service category has multiple services grouped under it, the system can use the sub-product information to determine the individual service, within the service category, to which the request is directed.

In still other embodiments, a gateway used for routing the EPP requests is provided. The gateway can include a receiving module configured to receive a request via EPP. The request can be to access a service, from among the plurality of services, offered by the service provider. The request may include XML that contains XML namespace information that may correspond to a service. The gateway can further include an analysis module coupled to the receiving module and configured to analyze the XML and extract the XML namespace information to determine the service to which the request is directed. The gateway may further include a routing module configured to determine a status of the service based at least in part on information included in a routing table and subsequently route the request to the service determined by the analysis module.

The following detailed description, together with the accompanying drawings will provide a better understanding of the nature and advantages of the present invention.

BRIEF DESCRIPTION OF THE DRAWINGS

FIG. 3 illustrates a routing table according to an embodiment of the present invention.

DETAILED DESCRIPTION

It would be advantageous to use EPP to route requests and messages over a network. As described above, each registrar has EPP connection with a registry in order to register and renew domain names. If the registry offers more domain name related services in addition to the domain provisioning services, the registrar may have to maintain additional modes of communication with the registry in order to access those additional services, e.g., domain name suggestion service. This is likely to increase complexity of the infrastructure on the registrar side because typically a registrar may be in communication with numerous registries. Having the ability to access all the offered services using a single EPP connection will greatly reduce the costs for the registrars. It is possible that these reduce costs could be shared with the end-user thereby increasing a registrar's competitive advantage.

On the registry side, having a single EPP connection with each registrar will greatly reduce the costs of maintaining separate multiple communication channels for each registrar. In addition, having the ability to seamlessly offer multiple services that are accessible through a single connection provides an impetus to development and deployment of new services by the registry thereby increasing the revenue sources for the registry.

Certain embodiments of the present invention relate to routing requests, received using EPP, to the appropriate service over a network. In some embodiments, the incoming EPP request includes XML namespace information. The XML namespace information may correspond to a service, e.g., domain name suggestion, domain name create, etc. The system can extract and analyze this XML namespace information to determine the service and then route the request to the appropriate service.

Other embodiments of the present invention relate to a EPP request that includes an XML sub-product information in addition to the XML namespace information. In such instances, the XML namespace information may correspond to a service category while the XML sub-product information may correspond to a specific service within the service category.

Figure 1:
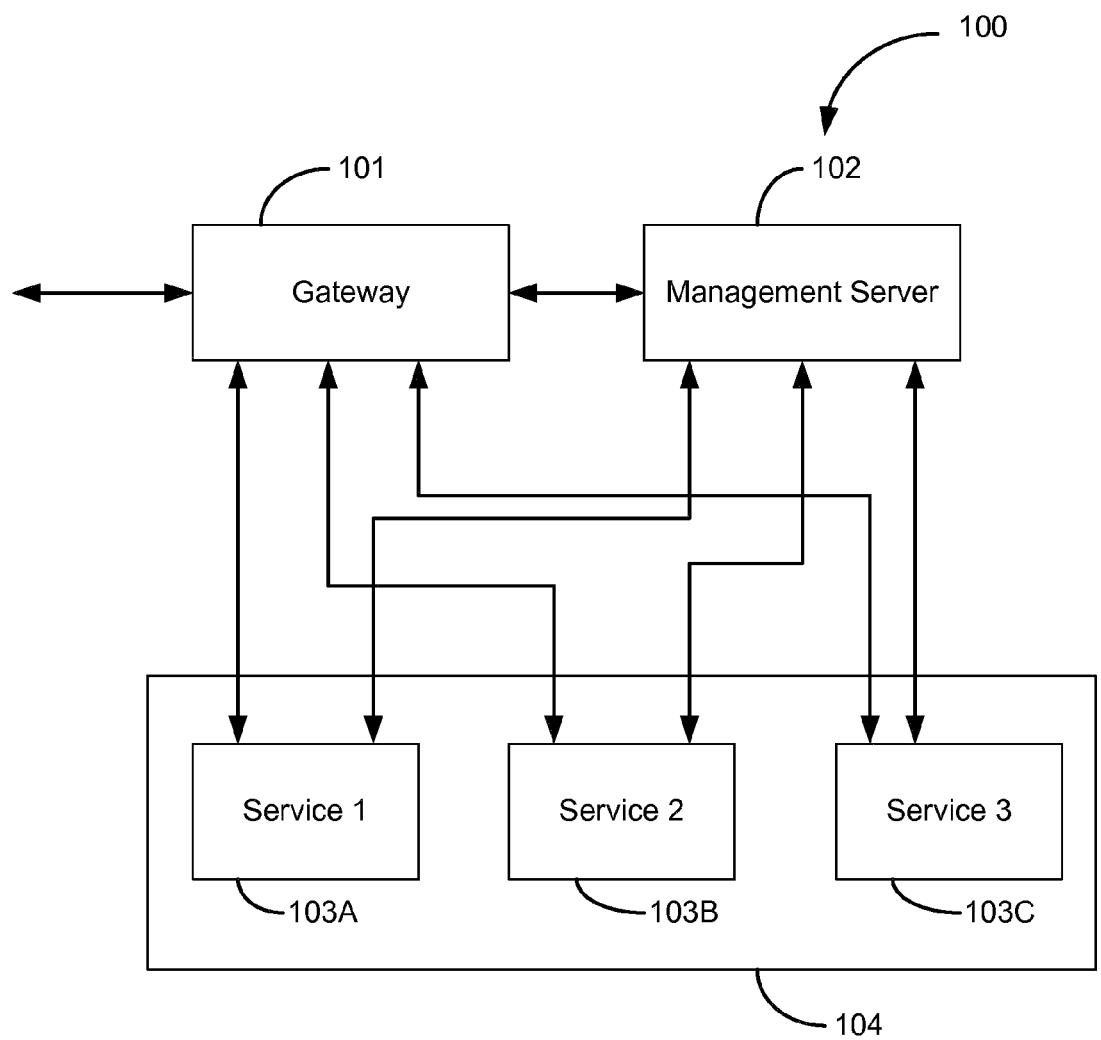
FIG. 1 is a block diagram of a system for routing requests according to an embodiment of the present invention.

FIG. 1 illustrates system 100 for routing requests received using EPP to the appropriate service on the network. System 100 can include gateway 101 that can receive the requests via the EPP. Gateway 101 can receive the incoming requests and determine the service that each of the request is directed at. Once the destination service is determined, gateway 101 can direct the request to that service. Gateway 101 can communicate with external systems and networks that are capable of sending requests using the EPP. As described earlier, the default transport for EPP is TCP however, in some embodiments, gateway 101 can be configured to receive and transmit EPP messages over Hypertext Transfer Protocol (HTTP). The structure and function of gateway 101 according to an embodiment of the present invention is described below.

Service platform 104 can be a scalable, fault tolerant platform for delivery of one or more services. Service platform 104 may have a database, user interface, and may use one or more protocols in order to communicate with the gateway and the management server. Service platform 104 can host one or more services 103A-C. Service platform 104 may have additional functionalities, which are not necessary to understand for the purposes of the subject matter of the present invention. Service platform 104 can have a database to store information related to the services and a user interface to enable a user to provide inputs to the management server for activities such as maintenance, upgrades, etc. Service platform 104 may use one or more protocols to communicate with the gateway and the management server. Services 103A-C may either be individual service, e.g., domain name suggestion, that are offered by a registry or a service category with individual services included in each category. Each of these services can be capable of communicating with gateway 101 and management server 102. Each service 103 can have unique information associated with it. Such information may include but is not limited to service name, connectivity information, and various applications that can interact with the service. In some embodiments, additional services may be added without affecting the normal functions of the service platform and other services. Service platform 104 can be implemented using one or more general purpose servers having the requisite functional capability.

In some embodiments, service platform 104 can be implemented in a cluster configuration with each service cluster server including multiple services or service categories. For example, J2EE clustering can be used to organize the services. In such an instance, a service cluster server URL may point to the service cluster server that includes the desired service and a service object identifier can be used to identify the particular service hosted by the server.

Management server 102 can be used to manage services 103 and can include information related to all of the available services. In some embodiments, each of the available services can communicate their unique information to management server 102. Management server 102 can be a repository of information related to each of the services. In some embodiments, the information provided by each service can include its operational status, connectivity information, name, etc. In some embodiments, management server 102 can communicate this information to gateway 101. Gateway 101 may store this information in one or more routing tables described below. Gateway 101 and management server 102 are coupled to one or more services 103A-C hosted by service platform 104. In some embodiments, management server 102 can perform various operations on each of the services such as enable, disable, add, delete, modify, etc. Management server 102 can be any computer system with the requisite functional capability.

In some embodiments, management server 102 can organize several related services into a service group. For example, cTLD may be a service group with individual services for dotjobs, dotty, and dotbiz included as part of the service group. A system administrator can have the ability to control the service group as a single entity and perform operations such as enable, disable, upgrade, etc on the group as a whole.

In some embodiments, each service can communicate information about itself to management server 102 during service startup. Management server 102 can provide a plurality of interfaces that can be used to disseminate information to external systems. In some embodiments, one or more gateways can connect to the management server using the plurality of interfaces. The gateways can "poll" the management server in order to gather information about the services. In an embodiment, the information about a service can include its operational status, connectivity information, etc. In some embodiments, addition service related information may also be available. For example, related information for each service may include information about its EPP handlers, EPP Poll handlers, and EPP extensions. A system administrator can make updates to the various services using an administrator user interface application on the management server. Once the system administrator makes changes to a service, management server 102 automatically communicates the updates/changes made to the services to gateway 101.

Further, while system 100 is described herein with reference to particular blocks, it is to be understood that these blocks are defined for convenience of description and are not intended to imply a particular physical arrangement of component parts. Further, system 100 can have other capabilities not specifically described herein.

Figure 2:
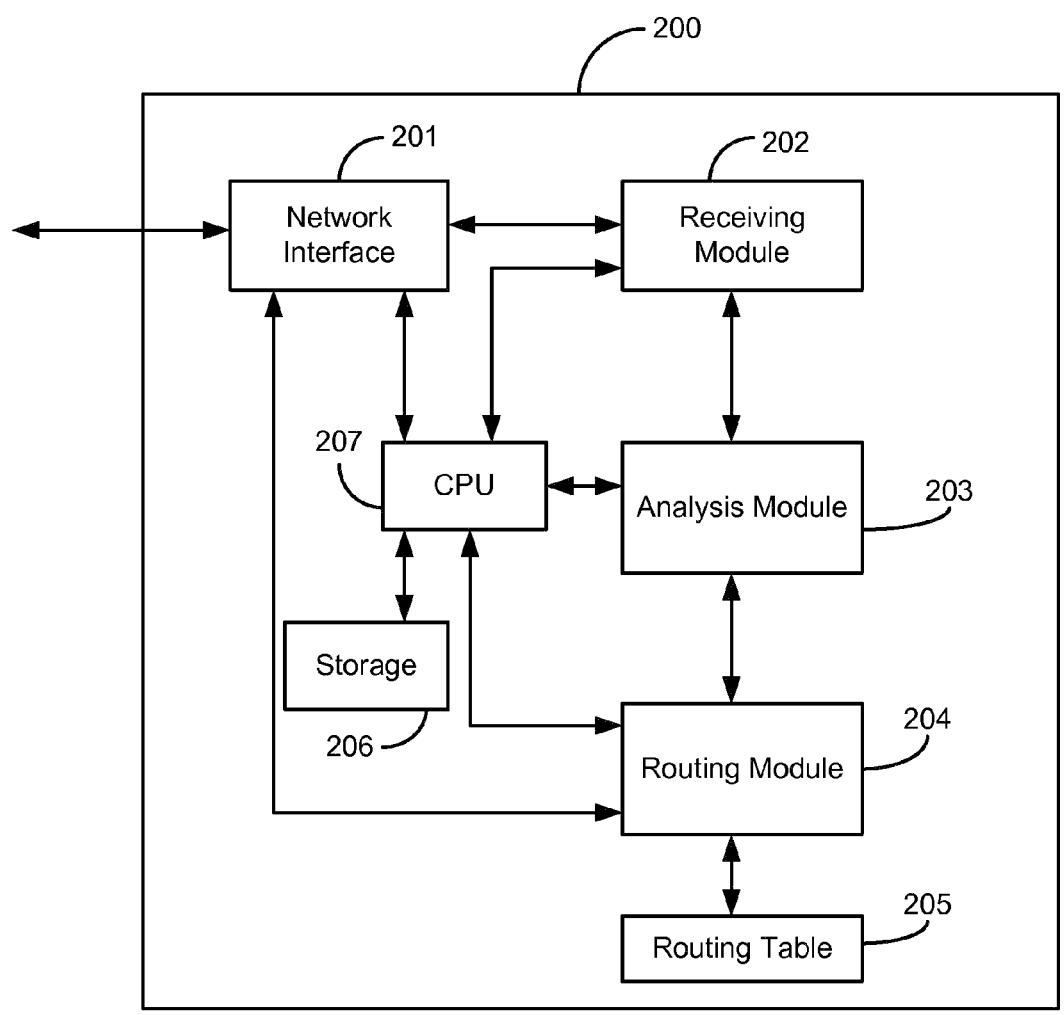
FIG. 2 is block diagram illustrating a gateway according to an embodiment of the present invention.

FIG. 2 illustrates gateway 200 according to an embodiment of the present invention. Gateway 200 may include a network interface module (NIM) 201. In some embodiments, NIM 201 can be configured to communicate with external systems and networks using any one of the conventional wired or wireless mediums. In addition, NIM 201 can be capable of accepting requests from external systems delivered via EPP over either the TCP or HTTP. NIM 201 can be coupled to receiving module 202.

Receiving module 202 can receive the incoming EPP requests. In some embodiments, receiving module 202 can verify that the incoming request is an EPP request by determining the structure of the request and comparing it with a standard EPP structure. The receiving module may be coupled to analysis module 203. Analysis module 203 may receive the incoming requests from receiving module 202 and analyze the request to determine the service to which the request is directed. In some embodiments, the EPP request can include XML namespace information. XML namespaces may provide a simple method for qualifying element and attribute names used in Extensible Markup Language documents by associating them with namespaces identified by Uniform Resource Identifier (URI) references. XML namespaces may be used for providing uniquely named elements and attributes in an XML instance. In some embodiments, the name of the service to which the request is directed may be included as part of the elements and/or attribute information. Analysis module 203 can parse the XML to extract the XML namespace information and determine a destination service for a particular request based on the namespace information. For example, the namespace information may be associated with name suggestion service. In such an instance, parsing of the XML included in the request will indicate that the request is intended for the name suggestion service.

In other embodiments, the XML code may include EPP subproduct information in addition to the XML namespace information. In such an instance, the XML namespace information can correspond to a service category, e.g., domain name services and the sub-product information may specify a particular service within the service category, e.g., dotty domain service or name suggestion service. Analysis module 203 can be also capable of parsing the XML included in the request to determine the namespace information and the EPP extension sub-product element.

Routing module 204 can receive the parsed XML from the analysis module indicating the service to which access is requested. Routing module 204 can verify the status of the service to determine if the service is currently active. In some embodiments, the routing module may verify the status information by consulting routing table 205. Details of routing table 205 are described below. Routing table 205 may be internal or external to routing module 204. In some embodiments, in addition to status information, routing module 204 can also ascertain other information about the service, e.g., connectivity information, in order to properly route the request. Routing module 204 can also be configured to route the request upon determination of the destination service.

Storage device 206 can be implemented, e.g., using disk, flash memory, or any other non-volatile storage medium. In some embodiments, storage device 206 may store routing table 205. Storage device 206 can also store other information like program instructions for performing the XML code analysis, routing the request based on the analysis, etc.

CPU 207, which can be implemented as one or more integrated circuits (e.g., a conventional microprocessor or microcontroller), can control the operation of gateway 200. In some embodiments, CPU 207 can retrieve program instructions stored in storage device 206 and execute the program to instruct analysis module 203 and/or routing module 204 to perform certain functions.

Further, while gateway 200 is described herein with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of devices including electronic devices implemented using any combination of circuitry and software.

It will be appreciated that the system configurations and components described herein are illustrative and that variations and modifications are possible. The gateway, the management server, and the service platform can have other capabilities not specifically described herein.

FIG. 3 shows routing table 300 according to an embodiment of the present invention. As described above, the routing table can include information associated with one or more available services. Routing table 300 can include service ID information 301. In some embodiments, service ID may be the XML namespace information included in the request command. Routing table 300 may also include sub-product information 302. As discussed earlier, the sub-product information can be an individual service within a group of service or may point to a category within a service group. For example, as illustrated in FIG. 3, the sub-product dotTV is part of the service group ctld. This information may be helpful in directing the request to a particular service or category within a service group. As discussed earlier, services that belong to a group may have sub-product information associated with them. Routing table 300 can also include service name 303, e.g., CTLD-domain create or name suggestion. In some embodiments, routing table 300 can also include version number of the service illustrated by item 304 of FIG. 3. This information may be required if there are multiple versions of the service that need to be in operation concurrently. In such an instance, version information 304 may be helpful in directing the request to the appropriate version for the service. The routing table may also include connectivity information 305. In some embodiments, the connectivity information may include a URL that is associated with a service or a service cluster server, as described above. The routing module described above can use the URL information to route the incoming request. In other embodiments, the connectivity information may additionally include routing information for an object within the service to which the command needs to be sent. Item 306 can include the status of the service, e.g., active or inactive. In some embodiments, the routing module may check the status of the service prior to sending the request. In some embodiments, in addition to 'active' and 'inactive' the status may also include other states such as 'disabled', 'offline', 'temporarily unavailable', and the like. The routing table may also include group ID information 307. Group ID information can indicate the name of a group/category to which a service belongs. For example, 'ctld' may be a group that includes domain, host, and contract services for 'dotty', 'dotjobs', 'dotcc', etc.

In some embodiments, routing table 300 can be dynamically updated every time a change is made to a service or a service group/category. In other embodiments, routing table 300 may be updated periodically. In some embodiments, all the information included in routing table 300 may be supplied by the management server. In other embodiments, routing table 300 may obtain information from various sources, e.g., the management server and the service platform. In some embodiments, the contents for one or more services and/or service categories included in the routing table might be fixed and may only be updated manually.

Although routing table 300 has been described with reference to certain information, it will be appreciated that the information shown is for illustrative purposes only. One skilled in the art would realize that routing table 300 can have other information in lieu of or in addition to the information illustrated in FIG. 3.

Figure 4:
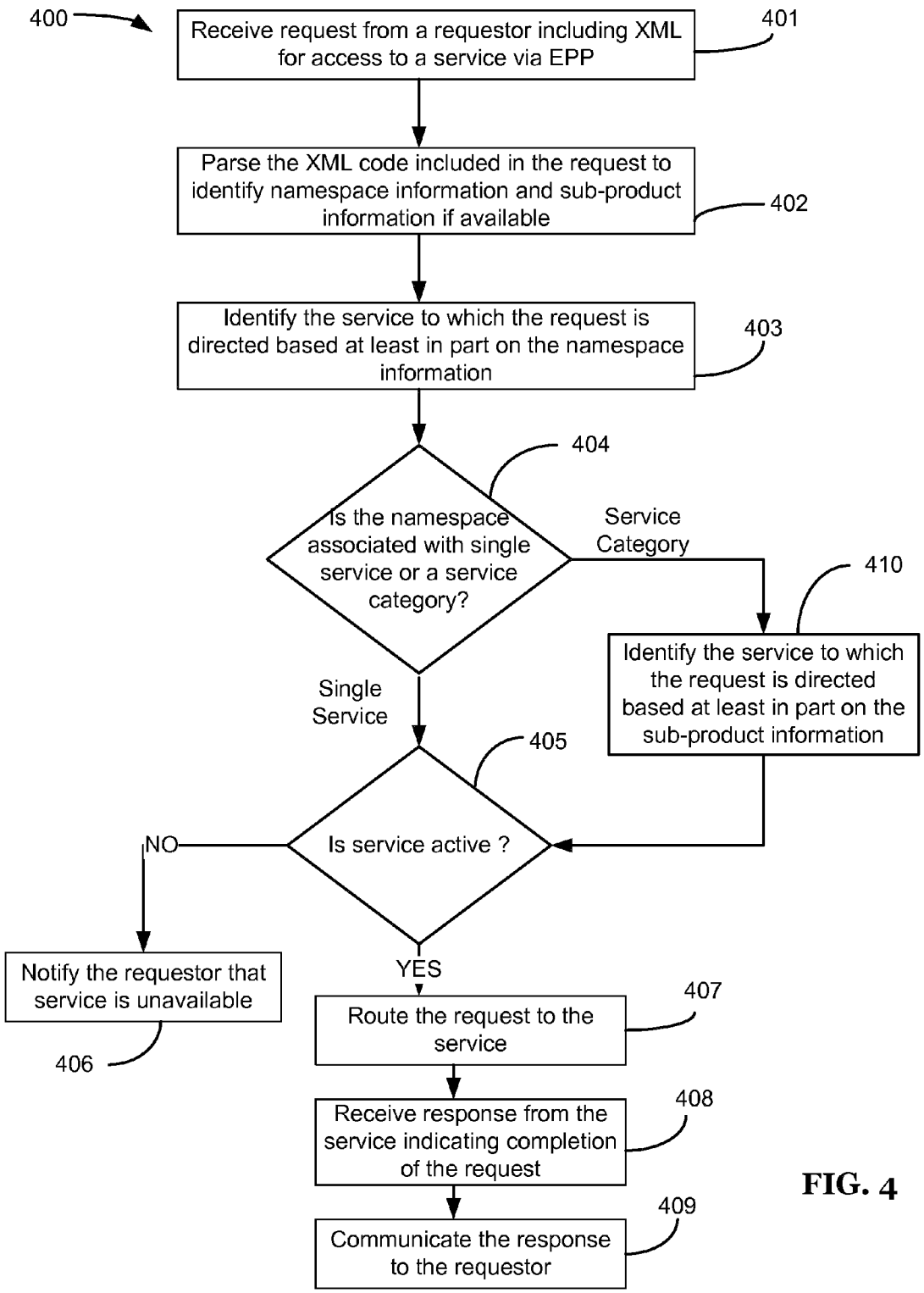
FIG. 4 is a flow diagram illustrating a method of routing requests according to an embodiment of the present invention.

FIG. 4 is a flow diagram of a process 400 for routing requests received via EPP to a service over a network. Process 400 may be implemented using, e.g., gateway 200 of FIG. 2. At step 401, the gateway may receive a request from a requestor to access one of the available services. The request may include XML that may have the information about the service that is to be accessed. At step 402, the incoming request can be parsed to extract XML namespace information and optionally the sub-product information included in the request. In some embodiments, the XML namespace information may include information about the service to be accessed.

At step 403, the XML namespace information may be used to determine the service to which the request is directed. Once the service to be accessed is determined, the process moves to step 404 where it can be determined whether the requested service is an individual service or a service category. In some embodiments, this determination can be made based on the XML namespace information and consulting the routing table to verify whether the namespace information belongs to an individual service or a service category.

If at step 404 it is determined that the namespace information corresponds to a individual service, a check can be made to verify if that service is active at step 405. If the service is not active, the system can send a message to the requestor indicating unavailability of the service at step 406. In some embodiments, the message may include additional information that the system administrator wants to convey to the requestor, e.g., time the service went offline, expected time of being reactivated, etc. If at step 405, it is determined that the service is active, the request is routed to the service at step 407. In some embodiments, the service may generate a request completion message at step 408 after processing the request. The request completion message may be a message indicating that the request was processed. The completion message can be communicated to the requestor at step 409. In an embodiment, the service sends the completion message to the gateway, which in turn forwards the completion message to the requestor. In some embodiments, the completion message may include additional information that may not be communicated to the requestor. For example, the completion message may include metadata specifying additional information about the request, e.g., execution time of the request. Such information may be required as part of a Service Level Agreement (SLA) negotiated by the service provider. The metadata information can be used to verify that the promised SLA criteria, e.g., execution time of a request, are being met by the service provider. In some embodiments, the gateway upon receiving the completion message including the metadata may log the metadata information for future use and only forward the completion message to the requestor.

On the other hand, if at step 404 it is determined that the namespace information corresponds to a service category, the system may, at step 410, use the sub-product information, included in the XML, to determine the service, within the service category, to which the request is directed. Once the service is identified, processing can resume at step 405 as described above.

In some embodiments, if the request includes XML namespace and sub-product information, but at step 404 it is determined that the service associated with the namespace information is an individual service, the system may ignore the sub-product information and route the request to the identified service using the XML sub-product information. In other embodiments, the system may return an error message indicating failure to route the request and the reason for the failure.

In some embodiments, if the request does not include a sub-product information and it is determined at step 404 that the XML namespace information is associated with a service category, the system may return an error message indicating a failure to route the message and reason for the failure.

It will be appreciated that process 400 described herein is illustrative and that variations and modifications are possible. Acts described as sequential can be executed in parallel, order of acts can be varied, and acts can be modified or combined. For instance, step 405 can be omitted and the request can be sent to the service without verifying a current status of the service. In some embodiments, steps 402 and 403 may be combined to parse the XML and concurrently extract the namespace information and or sub-product information to determine the service and/or the service category to be accessed.

While the invention has been described with respect to specific embodiments, those skilled in the art will recognize that numerous modifications are possible. For instance, the gateway and service management server may have additional functionalities not mentioned herein. In addition, a request may include information corresponding to one or more sub product, each sub-product information corresponding to a level within a service group/category hierarchy. Thus, it may be possible to have multiple levels of services within a service group/category and a request may identify a service by including one or more XML namespace and/or sub-product information.

In addition, embodiments of the present invention can be realized using any combination of dedicated components and/or programmable processors and/or other programmable devices. While the embodiments described above can make reference to specific hardware and software components, those skilled in the art will appreciate that different combinations of hardware and/or software components can also be used and that particular operations described as being implemented in hardware might also be implemented in software or vice versa.

Computer programs incorporating various features of the present invention can be encoded on various computer readable media for storage and/or transmission; suitable media include magnetic disk or tape, optical storage media such as compact disk (CD) or DVD (digital versatile disk), flash memory, and the like. Computer readable media encoded with the program code can be packaged with a compatible device or provided separately from other devices (e.g., via Internet download).

Thus, although the invention has been described with respect to specific embodiments, it will be appreciated that the invention is intended to cover all modifications and equivalents within the scope of the following claims.

What is claimed is:

1. A computer-implemented method for routing requests received using an Extensible Provisioning Protocol (EPP), the method comprising:
   receiving, from a requestor, a request to connect to a domain name system (DNS)-related service via the EPP, the request including extensible markup language (XML), wherein the XML includes information about the DNS-related service to which the request is directed;
   analyzing the XML to determine XML namespace information;
   determining the DNS-related service to which the request is directed based at least in part on the XML namespace information; and
   routing the request to the DNS-related service thereby providing the requestor access to the DNS-related service.

2. The method of claim 1, wherein prior to routing the request:
   determining whether the DNS-related service is active or not; and
   routing the request to the DNS-related service only in the event that the DNS-related service is active.

3. The method of claim 1, wherein in the event that it is determined that the DNS-related service is not active, sending a notification to the requestor indicating unavailability of the DNS-related service.

4. The method of claim 1, further comprising:
   analyzing the request to determine presence of a XML subproduct information;
   in the event that XML subproduct information is present, determining the DNS-related service to which the request is directed based at least in part on the XML namespace information and the XML subproduct information.

5. The method of claim 4, wherein the XML namespace corresponds to a DNS-related service category.

6. The method of claim 1, further comprising:
   receiving a response from the DNS-related service upon completion of a task associated with the request; and
   communicating the response to the requestor.

7. The method of claim 6, further comprising:
   receiving metadata associated with one or more parameters corresponding to a service level agreement, the metadata being included in the response; and
   generating a report associated with the service level agreement, the report based at least in part on the metadata.

8. The method of claim 7, wherein the metadata includes information about execution time of the request.

9. The method of claim 1, further comprising:
   receiving status and connectivity information associated with the DNS-related service; and
   updating a lookup table with the status and connectivity information associated with the DNS-related service.

10. The method of claim 9, wherein the connectivity information includes information about EPP handlers, EPP poll handlers, and EPP extensions associated with the DNS-related service.

11. The method of claim 1, wherein the DNS-related services comprise services related to domain name creation, domain name suggestion, or domain name registration renewal.

12. The method of claim 1, further comprising verifying that the request is an EPP request by determining a structure of the request and comparing the structure with a standard EPP structure.

13. A device for routing requests to a plurality of DNS-related services, the device comprising:
   a receiving module configured to receive a request via an extensible provisioning protocol (EPP) to access a service from among the plurality of DNS-related services, the request including an extensible markup language (XML) code, the XML code including information about the DNS-related service to be accessed;
   an analysis module coupled to the receiving module and configured to analyze the XML code and extract XML namespace information, the XML namespace information being indicative of the DNS-related service to be accessed; and
   a routing module coupled to the analysis module and configured to determine a status of the DNS-related service based at least in part on information included in a routing table and route the request to the DNS-related service.

14. The device of claim 13, wherein the routing table comprises information associated with the status and connectivity of the plurality of DNS-related services.

15. The device of claim 14, wherein the status and the connectivity information is dynamically updated.

16. The device of claim 13, wherein the receiving module is configured to receive requests over a Hypertext Transfer Protocol (HTTP) transport.

17. The device of claim 13, wherein the receiving module is configured to receive requests over a Transmission Control Protocol (TCP) transport.

18. The device of claim 13, wherein the analysis module is further configured to analyze the XML code to determine presence of a XML subproduct information.

19. The device of claim 18, wherein the analysis module is configured to extract the XML subproduct information and determine a sub-service associated with the XML subproduct information.

20. The device of claim 13, wherein the DNS-related services comprise services related to domain name creation, domain name suggestion, or domain name registration renewal.

21. The device of claim 13, wherein the analysis module is operable to verify that the request is an EPP request by determining a structure of the request and comparing the structure with a standard EPP structure.

22. A system for routing requests to a plurality of DNS-related services, the system comprising:
a service management server including information associated with the plurality of DNS-related services;
a gateway coupled to the service management server and configured to receive one or more requests for accessing a DNS-related service from among the plurality of DNS-related services, the requests being received using an extensible provisioning protocol (EPP); and
one or more service hosting servers coupled to the service management server and the gateway and configured to host the plurality of DNS-related services.

23. The system of claim 22, wherein the service management server is configured to receive data from each of the plurality of DNS-related services, the data indicating status, type, and connectivity information for each of the plurality of DNS-related services.

24. The system of claim 23, wherein the service management server communicates the status, type, and connectivity information to the gateway.

25. The system of claim 22, wherein the gateway includes a routing table, the routing table including status, type, and connectivity information for each of the plurality of DNS-related services.

26. The system of claim 25, wherein the routing table is dynamically updated to reflect change in the status, the connectivity, or both the status and the connectivity information of a DNS-related service.

27. The system of claim 22, wherein the DNS-related services comprise services related to domain name creation, domain name suggestion, or domain name registration renewal.

28. The system of claim 22, wherein the gateway is operable to verify that the request is an EPP request by determining a structure of the request and comparing the structure with a standard EPP structure.

29. A non-transitory computer-readable storage medium including instructions which when executed by a processor within a device, causes the processor to execute a method for routing requests for access to one or more DNS-related services, the method comprising:
receiving a request via a extensible provisioning protocol (EPP) for access to a DNS-related service, the request including an extensible markup language (XML) code, wherein the XML code comprises XML namespace information;
analyzing the XML code to extract the XML namespace information, the XML namespace information being indicative of the DNS-related service to which the request is directed; determining the DNS-related service to which the request is directed based at least in part on the XML names pace information; and
routing the request to the DNS-related service.

30. The non-transitory computer-readable storage medium of claim 29, wherein the method further comprises:
determining a XML subproduct information from the received request; and
determining a DNS-related service associated with the XML subproduct information.

31. The non-transitory computer-readable storage medium of claim 29, wherein the method further comprises, prior to routing the request:
determining status and connectivity information associated with each of the one or more DNS-related services; and
routing requests to the one or more DNS-related services based at least in part on the status and connectivity information.

32. The non-transitory computer-readable storage medium of claim 31, wherein the status information includes indication of whether a DNS-related service is active or inactive.

33. The non-transitory computer-readable storage medium of claim 31, wherein the status and connectivity information is stored in a routing table.

34. The non-transitory computer-readable storage medium of claim 33, wherein the routing table is updated dynamically to reflect changes in the status and connectivity information of each of the one or more DNS-related services.

35. A computer-implemented method for routing requests received using an Extensible Provisioning Protocol (EPP), the method comprising:
providing, from a requestor, a request to connect to a domain name system (DNS)-related service via the EPP to a registry, the request including extensible markup language (XML), wherein the XML includes information about the DNS-related service to which the request is directed; and
receiving, from the registry, access to the DNS-related service.

* * * * *